Aug. 17, 1965   D. W. MILLER ETAL   3,201,068
PLURAL PROPELLER PITCH CHANGE CONTROL SYSTEM
Filed July 8, 1963   3 Sheets-Sheet 1

INVENTORS
Walter F. Clark
Dale W. Miller
BY

Their Attorney

Aug. 17, 1965  D. W. MILLER ETAL  3,201,068
PLURAL PROPELLER PITCH CHANGE CONTROL SYSTEM
Filed July 8, 1963  3 Sheets-Sheet 2

INVENTORS
Walter F. Clark
Dale W. Miller
BY
W. E. Finke
Their Attorney

INVENTORS
Walter F. Clark
Dale W. Miller
BY
Their Attorney

United States Patent Office 3,201,068
Patented Aug. 17, 1965

3,201,068
PLURAL PROPELLER PITCH CHANGE CONTROL SYSTEM
Dale Webster Miller, Indianapolis, Ind., and Walter F. Clark, Huntsville, Ala., assignors to General Motors Corporation, Detroit, Mich., a corporation of Delaware
Filed July 8, 1963, Ser. No. 293,485
15 Claims. (Cl. 244—17.23)

This invention relates to control systems for aircraft, and particularly to a propeller control system for an aircraft of the vertical take-off and landing type.

It has been proposed to power vertical take-off and landing aircraft with four variable pitch propellers driven by one or more engines, wherein two propellers are arranged on opposite sides of the fuselage adjacent the front of the aircraft and two propellers are disposed on opposite sides of the fuselage adjacent the rear of the aircraft. The propellers are capable of operating in a constant speed mode and a manually selected blade angle, or beta, mode through a centrally mounted control system. The present invention relates to a central control system of the aforesaid type as well as pilot operated emergency blade angle selector and pilot operated roll and pitch controls.

Accordingly, among our objects are the provision of a central control system for controlling a plurality of variable pitch propellers in both the constant speed and beta modes of operation; the further provision of a control system for a propeller driven aircraft including pilot operated roll and pitch controls during vertical flight, and yaw control during level flight; and the still further provision of an aircraft control system embodying emergency pilot operated beta control means which can be operated upon failure of the central system.

The aforementioned and other objects are accomplished in the present invention by embodying dual operating means for the propeller controls. The propellers are of a known variable pitch type wherein each propeller embodies a pitch changing motor coupled to its master gear for conjointly varying the pitch of the blades of its respective propeller upon actuation thereof. The pitch changing motor of each propeller is controlled mechanically through a plurality of turnbuckle devices such that the pitch of all propellers can be collectively varied through the servo operated central system in either the constant speed or beta mode of operation, collectively varied through the emergency manually operated beta control when the central system is not operative, and wherein the pitch of the propellers can be differentially varied when the manual control is operated by the pilot for pitch and roll attitude control of the aircraft.

Further objects and advantages of the present invention will be apparent from the following description, reference being had to the accompanying drawings, wherein a preferred embodiment of the present invention is clearly shown.

Figure 1:
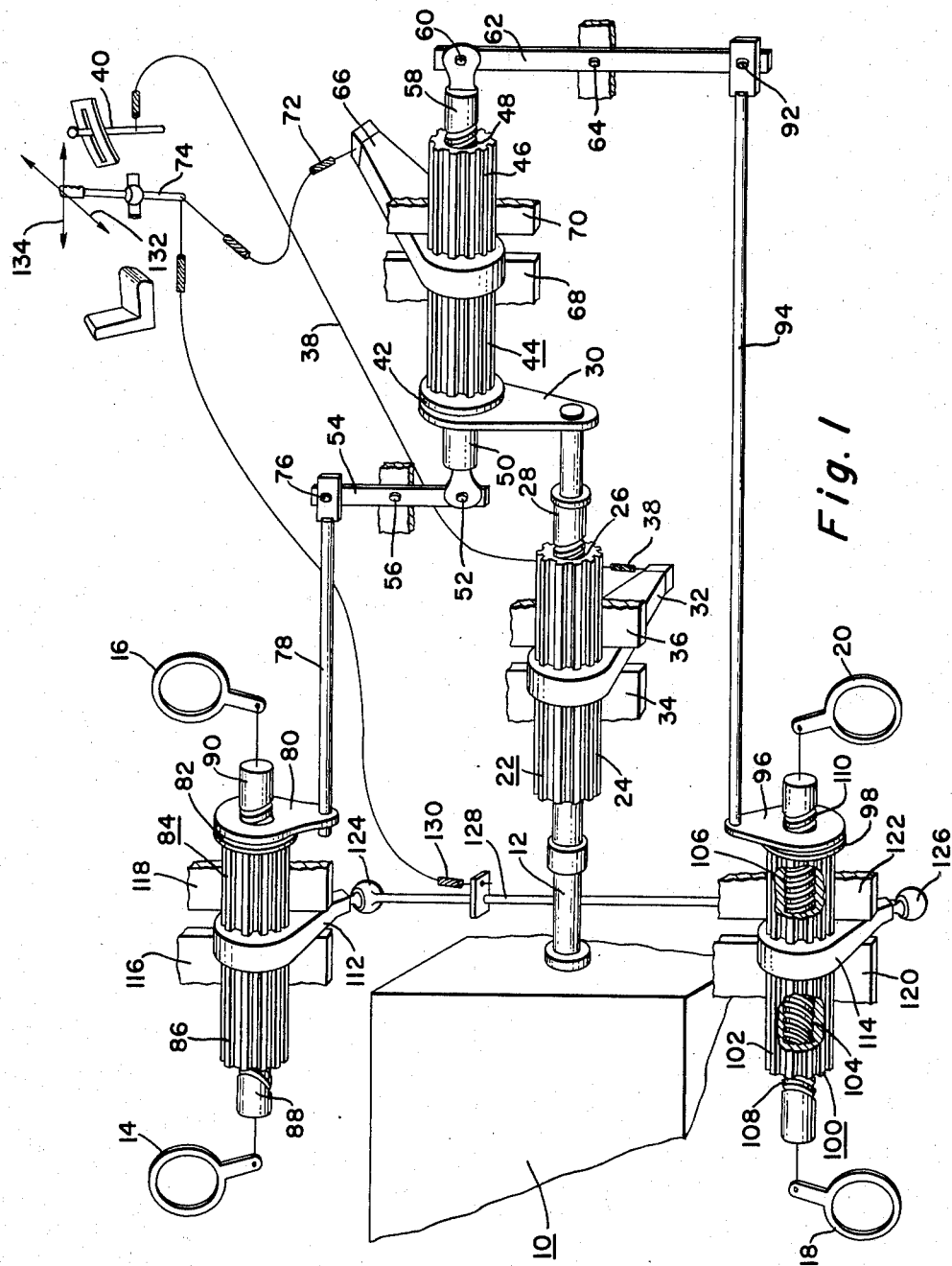
FIGURE 1 is a schematic perspective view, partly in section and partly in elevation, of the mechanical roll, pitch and emergency beta controls.

Referring to FIGURE 1, the aircraft control system includes a central control 10, having an output comprising a reciprocable rod 12, the construction and operation of the central control 10 being shown in FIGURE 2 and described hereinafter. As seen in FIGURE 3, the aircraft embodying the control system of the present invention has two variable pitch propellers 11 and 13 on opposite sides of the fuselage adjacent the front of the aircraft and two variable pitch propellers 15 and 17 on opposite sides adjacent the rear thereof. Each of the four propellers includes a pitch selecting control ring, these rings being designated 14, 16, 18 and 20. The control rings 14 and 16 are, respectively, for the rear and front left propellers and the control rings 18 and 20 are for the rear and front right propellers, respectively. As alluded to hereinbefore, control rings 14, 16, 18 and 20 control their respective pitch changing motors which, for example, may be of the hydraulic type or of any other type well known in the art. The pitch adjusting mechanism, per se, of each propeller constitutes no part of this invention and hence is not shown, but may be of the type shown in Patent #2,527,022 or Patent #2,792,064. Suffice it to say that each and every angular position of the control rings 14, 16, 18 and 20 represents a predetermined pitch position of the blades of its respective propeller.

The output rod of the central control 10 is attached to a reciprocable member 22 having exterior straight splines 24 and a threaded interior surface 26. A screw shaft 28 threadedly engages the interior threads 26, this screw shaft being connected to a lever 30. Accordingly, upon reciprocation of the rod 10, reciprocation will be imparted to the member 22 which in turn will impart reciprocation to the screw shaft 28 and the lever 30. The exterior straight splines 24 of the member 22 are engaged by a crank arm 32 which is restrained against reciprocation by a pair of stationary abutments 34 and 36, the crank arm 32 being connected by a flexible push-pull cable 38, which may be of the Bowden wire type, to a pilot operable emergency beta control stick 40.

The lever 30 is connected through a thrust bearing 42 to a turnbuckle member 44 having exterior straight splines 46 and oppositely threaded internal portions adjacent each end, one of which, 48, is shown. A first screw shaft 50 is threadedly connected with the member 44 for reciprocation therewith, the rod 50 being pivotally connected at 52 to a lever 54 having a intermediate fixed pivot 56. A second screw shaft 58 also engages the internal threads and the member 44, the screw shaft 58 being pivotally connected at 60 to a lever 62 for an intermediate stationary fixed pivot 64. The screw shafts 50 and 58 are of opposite hands. In a similar fashion, a crank arm 66 engages the external straight splines 46 of the member 44, the crank arm 66 being restrained against reciprocation by stationary abutments 68 and 70. The crank arm 66 is connected by a push-pull cable 72 to a second pilot operated control stick 74 for controlling pitch and roll.

The lever 54 is pivotally connected at 76 to a rod 78 which is attached to a lever 80 connected through a thrust bearing 82 with a turnbuckle member 84 having external straight spline teeth 86 and internal threaded portions, not shown, of opposite hands which threadedly engage screw shafts 88 and 90, likewise of opposite hands. The screw shaft 88 is connected to the control ring 14 while the screw shaft 90 is connected to the control ring 16. Similarly, the lever 62 is pivotally connected at 92 to a control rod 94, the control rod 94 being attached to a lever 96 connected through a thrust bearing 98 with a turnbuckle member 100. The turnbuckle member 100 likewise has external spline teeth 102 and internal threaded portions 104 and 106 of opposite hands with which screw shafts 108 and 110, of opposite hands, are threadedly connected. The screw shafts 108 and 110 are respectively connected to the control rings 18 and 20.

In addition, the turnbuckle members 84 and 100 are engaged by crank arms 112 and 114, respectively, the crank arms 112 and 114 being restrained against reciprocation. Thus, the crank arm 112 engages the straight splines 86 of the turnbuckle member 84 and is held against reciprocation by spaced stationary abutments 116 and 118, while the crank arm 114 engages the straight spline teeth 102 and is held against reciprocation by stationary abutments 120 and 122. The two crank arms 112 and 114 are interconnected through ball and socket joints 124 and 126 with a reciprocating rod 128 having a connection with a push-pull cable 130. The cable 130 is likewise connected to the pilot's control stick 74. The pilot's control stick 74 is movable in two planes disposed at right angles to each other as indicated by the arrows 132 and 134. When the control stick 74 is moved in the plane of arrows 132, the cable 72 is actuated, whereas when the control stick 74 is moved in the plane of arrows 134, the cable 130 is actuated.

Figure 2:
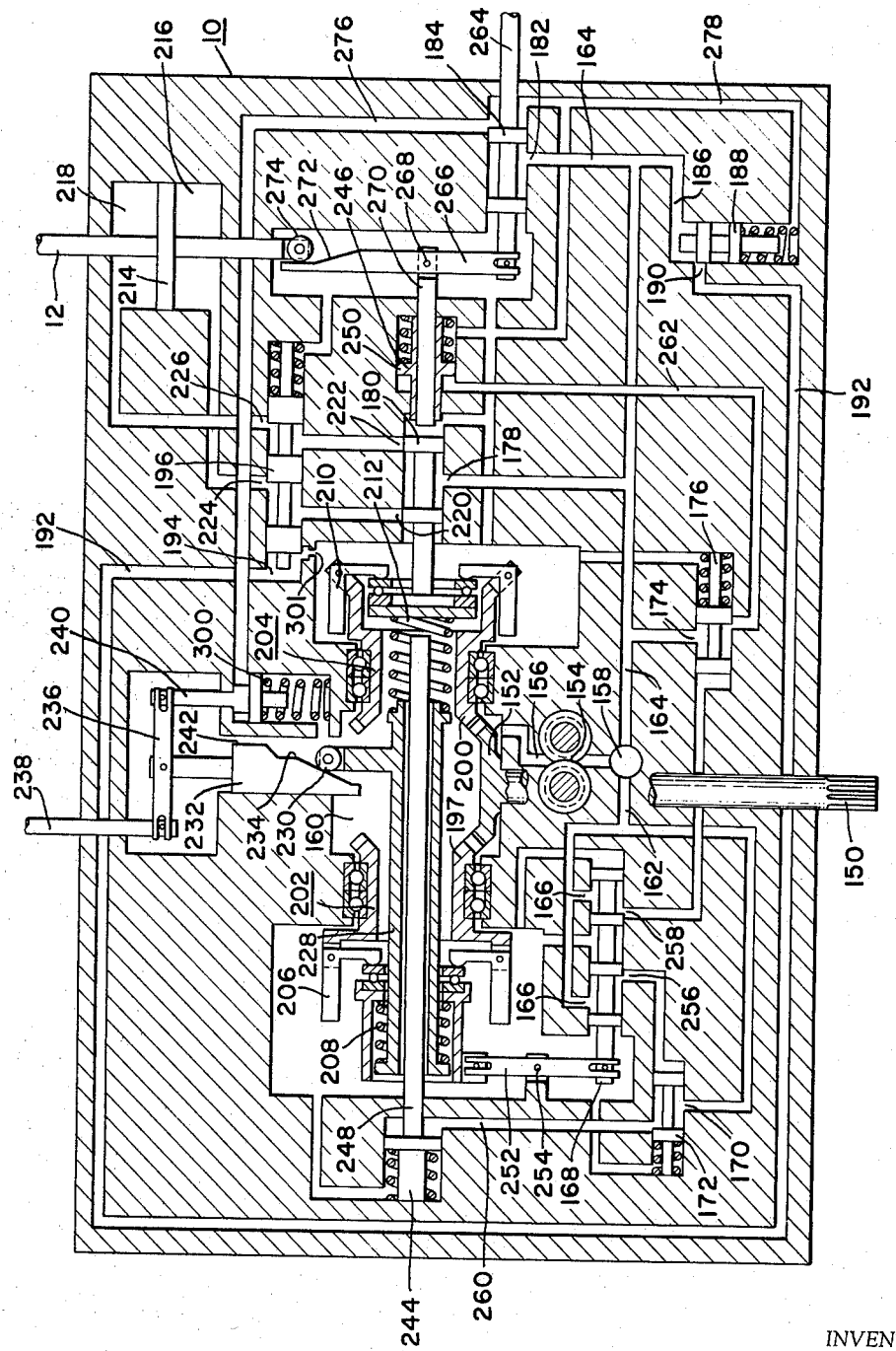
FIGURE 2 is a hydraulic and mechanical schematic of the central control system.
Figure 3:
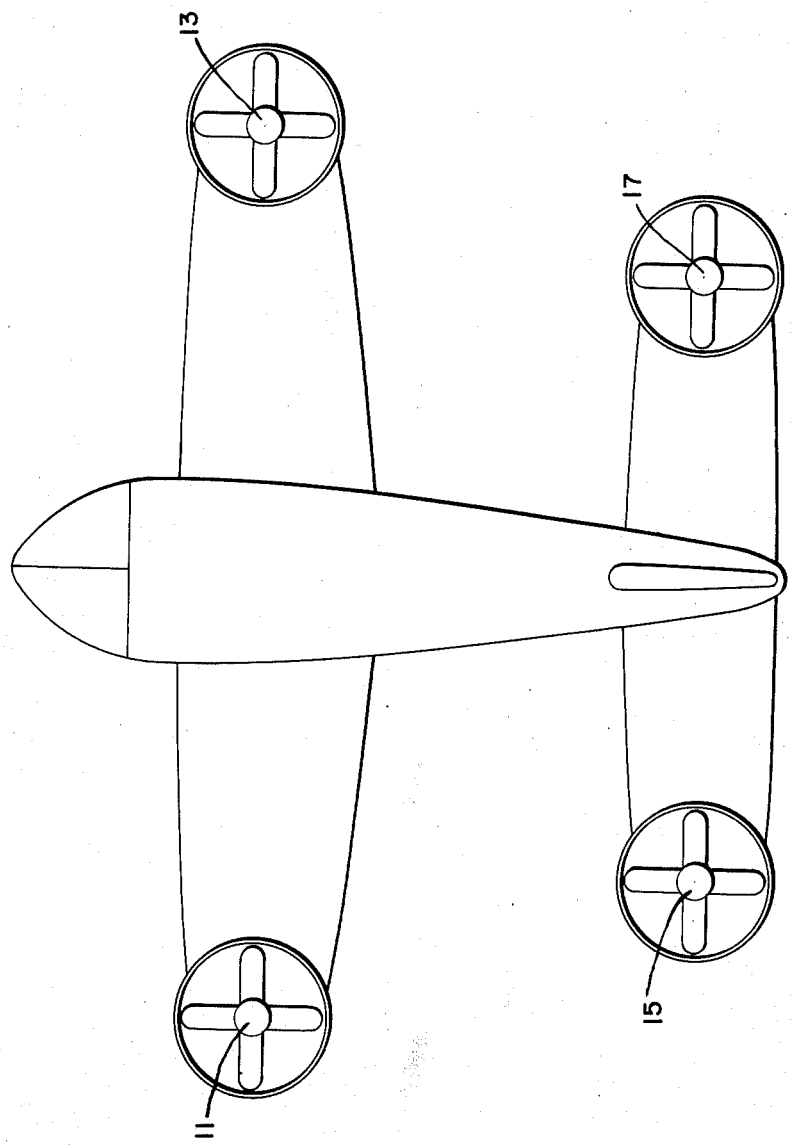
FIGURE 3 is a diagrammatic view of an aircraft embodying the propeller arrangement of the present invention.

Referring to FIGURE 2, the central control 10 is designated to operate the propellers in both the constant speed and beta modes of operation. The central control includes an input drive shaft 150 which is rotated at propeller speed, or at the speed of a coupling shaft between propellers, this shaft being connected to a bevel gear 152. The shaft 150 also drives a gear pump 154 having an inlet 156 and an outlet 158. The pump 154 draws oil from a sump 160 and discharges oil under pressure through branch conduits 162 and 164. Branch conduit 162 connects with inlet ports 166 of a safety governor distributor valve 168 and the inlet port 170 of a shuttle valve 172. Branch conduit 164 connects with the inlet port 174 of a shuttle valve 176, the inlet port 178 of a governor valve 180, the inlet port 182 of a beta reset selector valve 184, and the inlet port 186 of a relief valve 188. The relief valve 188 has an outlet port 190 connected by a conduit 192 to a servo chamber 194 of a locking valve 196, the servo chamber 194 being connected to the sump 160.

The bevel gear 152 meshes with a pair of bevel gears 197 and 200 which are formed by speed cups 202 and 204, respectively, journalled by ball bearings within the housing. The speed cup 202 carries centrifugal flyweights, outward movement of which is opposed by a speeder spring assembly 208. The flyweights 206 and the speeder spring assembly 208 constitute an underspeed and an overspeed safety governor, the operation of which will be described hereinafter.

The speed cup 204 carries flyweights 210, outward movement of which is opposed by a speeder spring assembly 212, the flyweights 210 and speeder spring 212 constituting an isochronous governor. To this end, the speeder spring assembly 212 is connected to governor valve 180 which controls the flow of hydraulic fluid to and from a hydraulic actuator including a piston 214 that divides its cylinder into an increase pitch chamber 216 and a decrease pitch chamber 218. The governor valve 180 has outlet ports 220 and 222 connected to the bore of the lock valve 196 which, in turn, has ports 224 and 226 connected to the opposed chambers 216 and 218 of the actuator. It is to be understood that the rod of the piston 214 is the reciprocable control rod 12 shown and described in connection with FIGURE 1.

It will be appreciated that the isochronous governor controlled valve 180 will maintain propeller speed substantially constant at the speed setting of the isochronous governor which is controlled by a reciprocable sleeve 228 having a follower roller 230 coacting with a reciprocable cam 232. The cam 232 has an inclined surface 234 for controlling the speed setting of the speeder spring assemblies 212 and 208. The cam 232 is pivotally connected to the center of a lever 236, opposite ends of the lever 236 having pin and slot connections with an r.p.m. input schedule rod 238 and a beta reset plunger 240. Since the plunger 240 is held stationary during operation of the aircraft propeller system in the constant speed mode by spring 300, reciprocation of the rod 238 will impart pivotal movement to the lever 236 about its connection with the plunger 240 so as to shift the cam 232. The rise 242 of the cam 232 is utilized to block out the governor during beta operation as will be pointed out hereinafter.

The safety governor including the flyweights 206 and speeder spring assembly 208 includes an underspeed actuator 244 and an overspeed actuator 246. The underspeed actuator 244 is connected to a reciprocable rod 248, and the overspeed actuator is connected to a reciprocable sleeve 250. In addition, the speeder spring assembly 208 has a pin and slot connection with one end of a lever 252 having an intermediate fixed pivotal connection 254, the other end of the lever 254 having a pin and slot connection with the safety governor distributor valve 168. The safety governor distributor valve 168 includes outlet ports 256 and 258 which are connected respectively to the underspeed pilot valve 172 and the overspeed pilot valve 176. The pilot valves 172 and 176, in turn, are hydraulically connected by conduits 260 and 262 with the under and over speed actuators 244 and 246, respectively. The actuators 244 and 246 are spring biased in opposite directions and are capable of mechanically positioning the governor valve 180 upon failure of the isochronous governor comprising the flyweights 210 and the speeder spring assembly 212, or if propeller speed should deviate more than the predetermined amount from the setting of the isochronous governor, for example, plus or minus three percent.

The beta reset selector valve 184 has an input rod 264, and is connected through a pin and slot connection to one end of a lever 266 having an intermediate pivot 268 on a reciprocable rod 270. The other end of the lever 266 has a cam surface 272 with which a follower roller 274 attached to the actuator piston 214 is associated.

Operation of the central control 10 during the constant speed mode results in collective pitch adjustment of all four propellers when propeller speed deviates from the speed setting of the governor. Thus, should the propellers overspeed, the flyweights 210 will pivot outward thereby moving the governor valve 180 to the left so as to call for an increase in propeller pitch to decrease propeller speed. Conversely, should the propeller underspeed, the flyweights will pivot inwardly thereby moving the governor valve 180 to the right so as to call for a decrease in propeller pitch and thus increase propeller speed. However, if during the governing mode, the isochronous governor comprising the flyweights 210 and the speeder spring assembly 212 should fail, or propeller speed should deviate more than three percent from the setting thereof, the flyweights 206 and the speeder spring assembly 208 will go into action. If the propellers should underspeed, the flyweights 206 will pivot inwardly and thus impart clockwise movement to the lever 252 so as to move the distributor valve 168 to the left such as to close off the port 256 whereby the spring biased shuttle valve 172 will connect the conduit 260 to drain thus enabling the spring biased underspeed actuator 244 to move the rod 248 to the right and hence act through the speeder spring assembly 212 to move the governor valve 180 to the right so as to call for a decrease in propeller pitch. Here again, the pitch of all four propellers is collectively decreased. Conversely, if the propellers overspeed more than three percent, the flyweights 206 will pivot outwardly and thus impart counterclockwise movement to the lever 252 so as to move the valve 186 to the right and thus cut off port 258 so that the shuttle valve 176 will be spring actuated and thus connect conduit 262 to drain. In this manner, the overspeed actuator 250 will engage the governor valve 180 and move it to the left so as to call for an increase in the pitch of the propellers.

Upon a hydraulic failure, that is, a failure of pump 154, the lock valve 196 will be operated by its spring to block the ports 224 and 226 and thus hold the pitch adjusting piston 214 in its last operating blade angle position. Valve 196 is normally held open by the pressure across the restrictor orifice 301. It is under these conditions that the pilot can use the emergency blade angle control stick 40 described in connection with FIGURE 1. It is pointed out that the pilot's manual controls are located between the central control device 10 and the propellers thus enabling the pilot to control the aircraft with a central device 10 locked.

The central device 10 can also be used to control the beta mode of operation through the rod 264. When the rod 264 is moved to the right, the valve 184 will interconnect port 182 with conduit 276 and disconnect it from conduit 278. When fluid under pressure is applied to conduit 276, the beta reset plunger 240 is actuated thus moving the cam 232 downwardly so that the follower 230 engages the rise 242. In this manner the speeder spring assembly of both the isochronous and safety governors are reset to such a position that they are effectively blocked out. Thereafter, reciprocable movement of the plunger 264 and the rod 270 directly controls the valve 180 since the speeder spring will maintain the valve 180 in engagement with the end of the rod 270. The cam surface 272 constitutes the beta schedule and provides a follow-up, or feedback, system for returning the valve 180 to the neutral position when the blade angle selected has been obtained by the piston 214. In other words, the input to the lower end of the lever 266 calls for a certain blade angle and when the piston 214 moves to the desired position it will reposition the lever 266 through the cam surface 272 when the selected blade angle has been obtained.

Referring again to FIGURE 1, during normal control of the aircraft by the central device 10, the output rod 12 reciprocates, and thus the spline member 22 moves as a fixed rod so as to collectively vary the pitch of the propellers by imparting reciprocating movement to the turnbuckle member 44 and hence through the two linkages to the turnbuckle members 84 and 100. If there is a failure in the central control device 10, the rod 12 will remain fixed, but the pilot can collectively adjust the pitch of the propellers through the beta control stick 40 which will rotate the member 24 so as to impart reciprocation to the screw shaft 28, the lever 30 and the member 44. It is also pointed out that the pilot can override the central control device at any time to directly control the blade angle of the propellers.

Moreover, inasmuch as the propellers on vertical take-off and landing aircraft are used for attitude control purposes, by differentially varying the pitch of the right and left hand propellers a rolling moment is produced and by differentially varying the pitch of the front and rear propellers a pitching moment is produced. The roll control mechanism comprises the stick 74 which is moved in the plane of arrows 132 to actuate the cable 72 so as to rotate the member 44. Rotation of the member 44 will result in reciprocation of the screw shafts 50 and 58 in opposite directions so as to differentially vary the pitch of the left and right propellers. Thus, the blade angle, or pitch, of the left propellers changes in a direction opposite but equal to the blade angle of the right propellers.

The pitch control for the aircraft through the stick 74 is effected by movement in the direction of arrows 134 so as to move the cable 130 and reciprocate the rod 128. The rod 128 will, in turn, rotate the turnbuckle members 84 and 100 through crank arms 112 and 114, respectively, and in so doing the shafts 88 and 90 will move in opposite directions as will the shafts 108 and 110. In this manner, both front propellers will have their blade angle, or pitch, position changed in a direction opposite but equal to the blade angle change of the rear propellers. This differential change in blade angle of the front and rear propellers will create a pitching moment.

While the embodiment of the invention as herein disclosed constitutes a preferred form, it is to be understood that other forms might be adopted.

What is claimed is as follows:

1. A control system for an aircraft having a plurality of engine driven variable pitch propellers comprising, a central control device for collectively varying the pitch of said propellers in either constant speed or beta modes of operation, and emergency manually operated control means for collectively varying the pitch of said propellers in the beta mode of operation independently of said control device.

2. A control system for an aircraft having a plurality of engine driven variable pitch propellers on opposite sides of the aircraft fuselage and adjacent the front and rear thereof comprising, a central control device for collectively varying the pitch of said propellers in either constant speed or beta modes of operation, first manually operated control means for differentially varying the pitch of said propellers to produce either rolling or pitching moments to control the attitude of the aircraft independently of said central control device, and second manually operable means for collectively varying the pitch of said propellers in the beta mode of operation independently of said central control device.

3. A control system for an aircraft having a plurality of engine driven variable pitch propellers comprising, a servo operated central control device for controlling the pitch of said propellers in either constant speed or beta modes of operation, and manually operable mechanical control means for collectively varying the pitch of said propellers independently of said central control device.

4. A control system for an aircraft having a plurality of engine driven variable pitch propellers on opposite sides of the aircraft fuselage and adjacent the front and rear thereof comprising, a servo operated central control device for collectively varying the pitch of said propellers in either constant speed or beta modes of operation, first manually operable mechanical means for differentially varying the pitch of said propellers independently of said central control device to produce either rolling or pitching moments to control the attitude of the aircraft, and second manually operable means for collectively varying the pitch of said propellers in the beta mode of operation independently of said central control device.

5. A control system for an aircraft having a plurality of engine driven variable pitch propellers comprising, a servo operated central control device including a hydraulically operated actuator for collectively varying the pitch of said propellers in either constant speed or beta modes of operation, mechanical means interconnecting said actuator and said propellers, and emergency manually operable control means connected to said mechanical means for collectively varying the pitch of said propellers in the beta mode of operation independently of said central control device.

6. The control system set forth in claim 5 wherein said central control device includes means for automatically locking said actuator in its adjusted position upon failure thereof.

7. A control system for an aircraft having a plurality of engine driven variable pitch propellers on opposite sides of the aircraft fuselage and adjacent the front and rear thereof comprising, a servo operated central control system including a hydraulically operated actuator connected to said propellers for collectively varying the pitch of said propellers in either constant speed or beta modes of operation, mechanical means interconnecting said actuator and said propellers, first manually operable control means connected with said mechanical means for differentially varying the pitch of said propellers to produce either pitching or rolling moments independently of said central control device to control the attitude of the aircraft, and second manually operable means for collectively varying the pitch of said propellers in the beta mode of operation independently of said central control device.

8. A control system for an aircraft having four engine driven variable pitch propellers, two of which are mounted adjacent the front on opposite sides of the aircraft fuselage and two of which are mounted adjacent the rear on opposite sides of the aircraft fuselage, each of said propellers having a pitch control member, comprising, a servo operated central control device including a hydraulically operated actuator for collectively varying the pitch of said propellers in either constant speed or beta modes of operation, and mechanical means comprising a pair of turnbuckle mechanisms interconnecting the pitch control members of the left front and left rear propellers and the right front and right rear propellers, respectively, a third turnbuckle mechanism connected with said first and second turnbuckle mechanisms and mechanical means interconnecting said third turnbuckle mechanism and said actuator.

9. The control system set forth in claim 8 wherein said last recited means comprises an externally straight splined sleeve having an internally threaded portion and a screw shaft having threaded engagement therewith.

10. The control system set forth in claim 9 including emergency manually operable control means for collectively varying the pitch of said propellers in the beta mode of operation independently of said central control device.

11. The control system set forth in claim 10 wherein said last recited means comprises a crank arm connected with said splined sleeve for imparting rotation thereto, and means restraining reciprocation of said crank member.

12. The control system set forth in claim 8 including manually operable control means for producing a rolling moment by differentially varying the pitch of the left and right hand propellers to control the attitude of the aircraft independently of said central control device.

13. The control system set forth in claim 12 wherein said third turnbuckle mechanism comprises an externally straight splined sleeve having internally threaded portions of opposite hands and a pair of screw shafts threadedly engaging the same, and wherein the manually operable control means comprises a crank arm for rotating said splined sleeve to effect reciprocation of said screw shafts in opposite directions.

14. The control system set forth in claim 8 including manually operable control means for producing a pitching moment by differentially varying the pitch of the front and rear propellers to control the attitude of the aircraft independently of the central control device.

15. The control system set forth in claim 14 wherein the first and second turnbuckle mechanisms comprise externally splined sleeves having internally threaded portions of opposite hands and a pair of screw shafts threadedly engaging the same, and wherein said manually operable means comprises a pair of interconnected crank arms engaging said splined sleeves for concurrently rotating said splined sleeves to effect reciprocation of the screw shafts of each of the first and second turnbuckle mechanisms in opposite directions.

References Cited by the Examiner
UNITED STATES PATENTS

| | | | |
|---|---|---|---|
| 2,280,654 | 4/42 | Mader | 170—135.24 X |
| 2,549,108 | 4/51 | Martin | 170—135.24 |
| 2,798,563 | 7/57 | Miller et al. | 170—160.21 |
| 3,008,524 | 11/61 | Kaplan | 170—135.24 |
| 3,107,881 | 10/63 | Stuart | 170—135.29 X |
| 3,120,362 | 2/64 | Curtis et al. | 244—12 X |

FERGUS S. MIDDLETON, *Primary Examiner.*

JULIUS E. WEST, *Examiner.*